May 19, 1931. G. L. ROCK 1,806,119
METHOD OF AND APPARATUS FOR PRODUCING TUBULAR ARTICLES
Filed Oct. 10, 1929 5 Sheets-Sheet 1
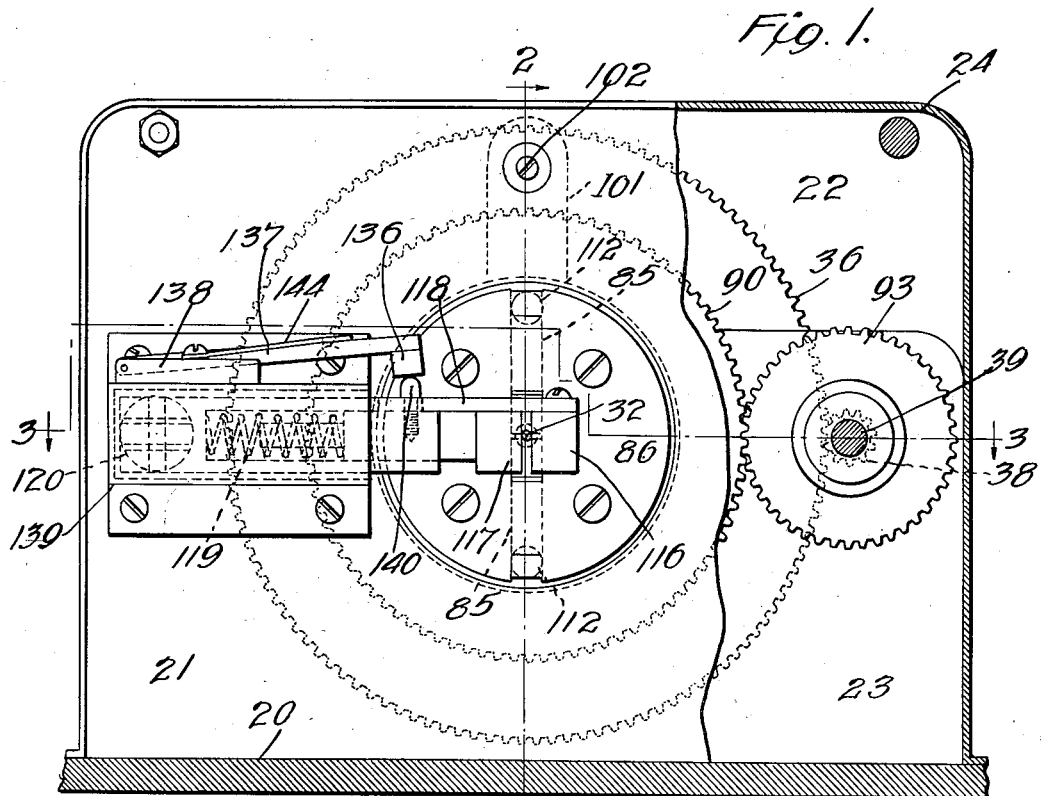
Fig. 1.
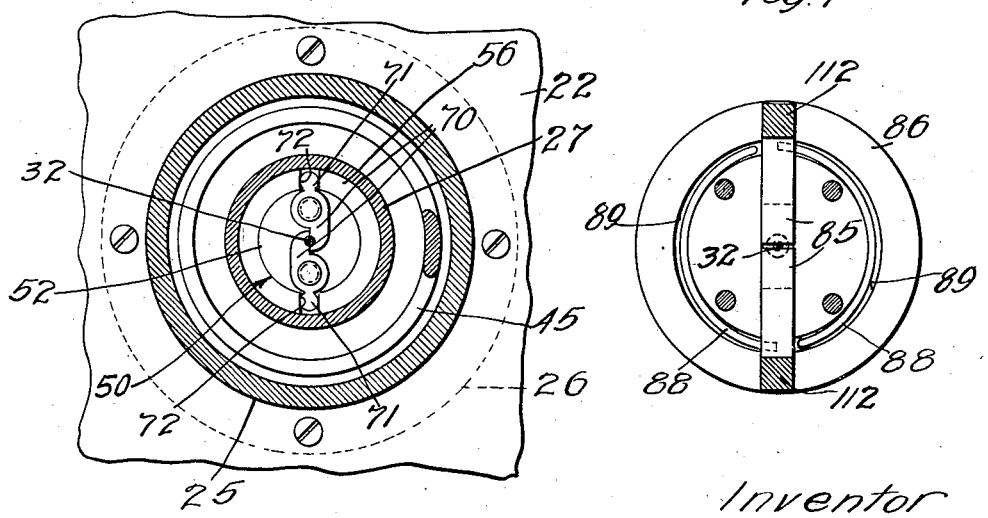
Fig. 5
Fig. 7
Inventor
George L. Rock
By [signature] Atty.

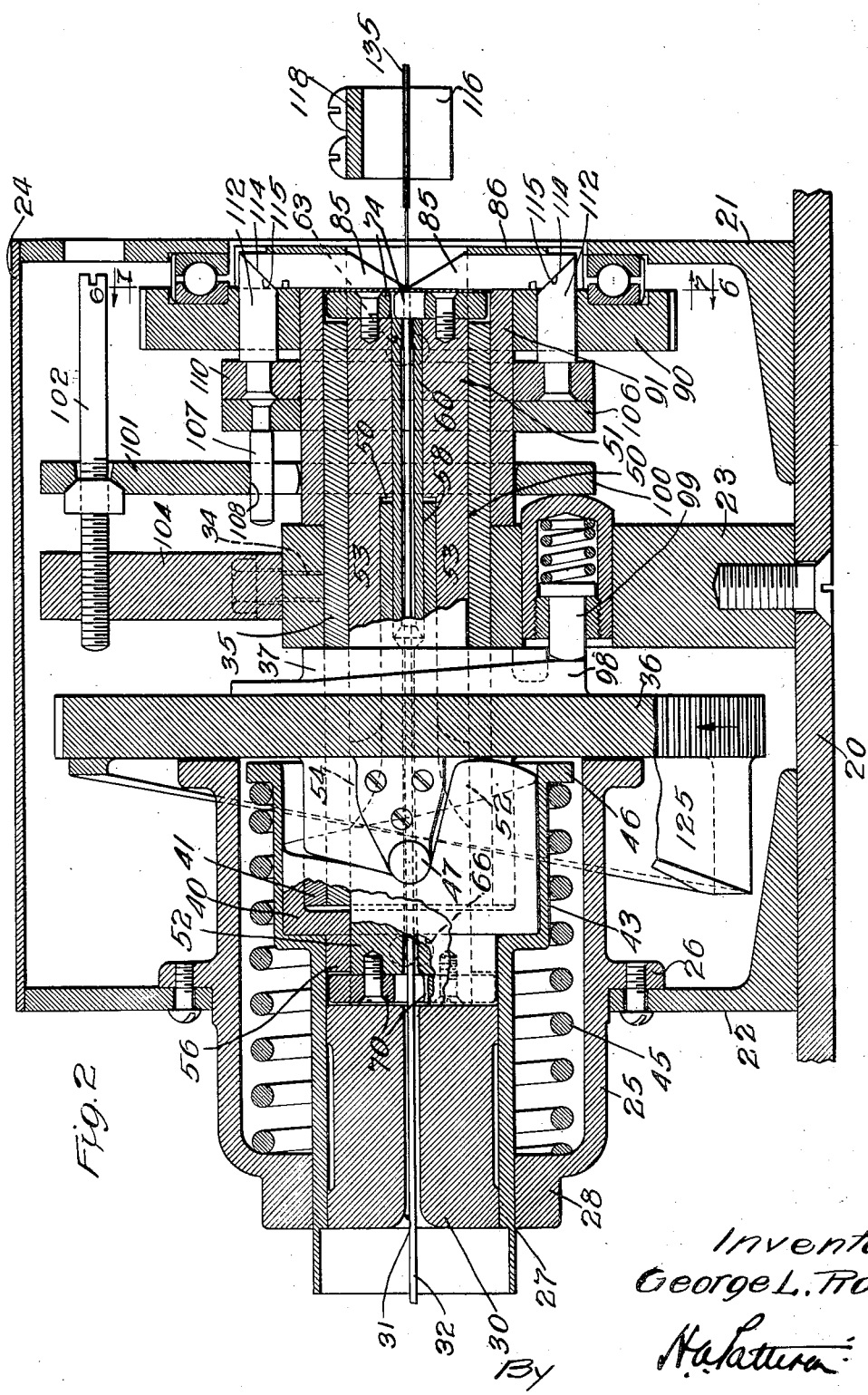

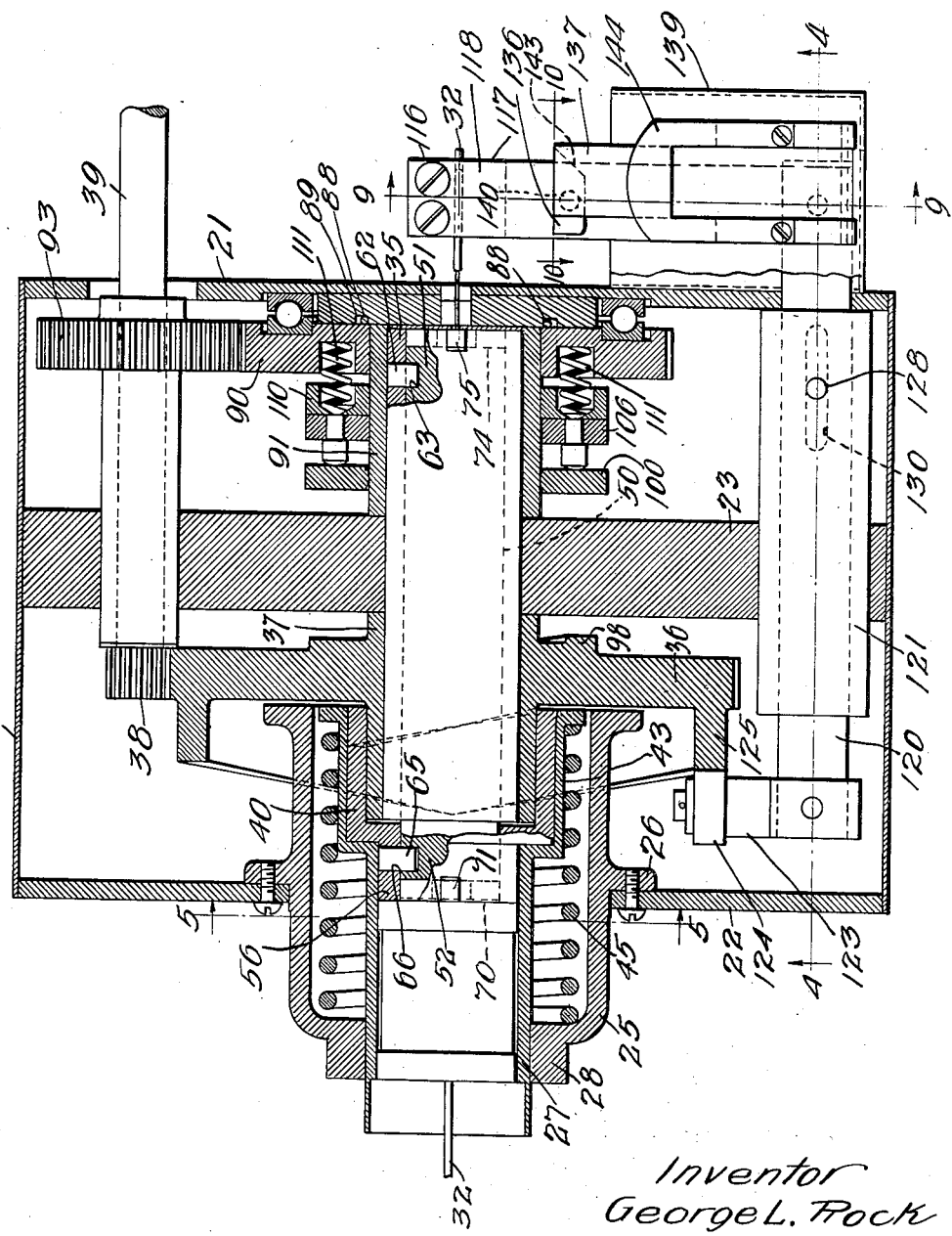

May 19, 1931. G. L. ROCK 1,806,119
METHOD OF AND APPARATUS FOR PRODUCING TUBULAR ARTICLES
Filed Oct. 10, 1929 5 Sheets-Sheet 4

Inventor
George L. Rock
By [signature]
Atty.

May 19, 1931.  G. L. ROCK  1,806,119
METHOD OF AND APPARATUS FOR PRODUCING TUBULAR ARTICLES
Filed Oct. 10, 1929  5 Sheets-Sheet 5
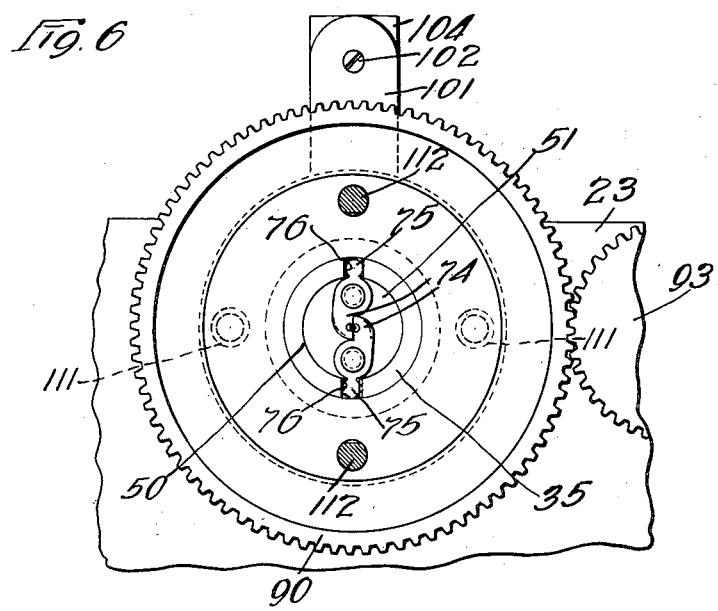
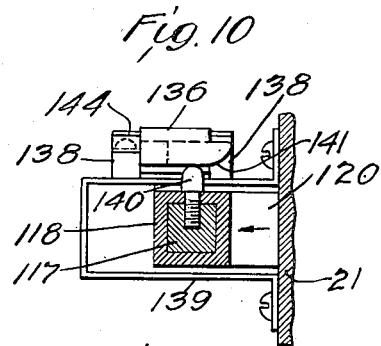
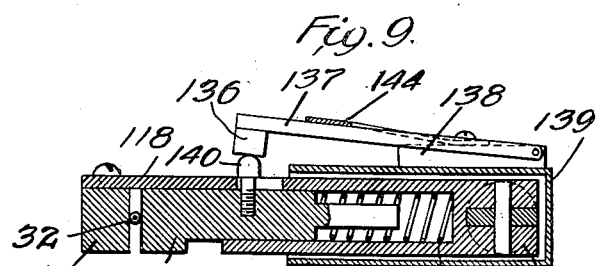
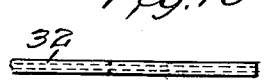
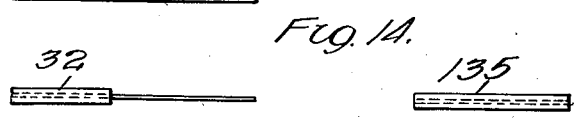
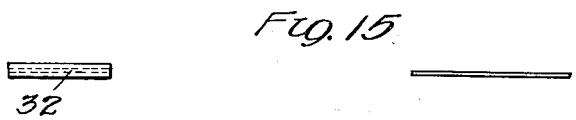
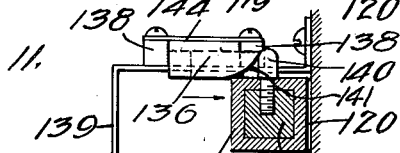
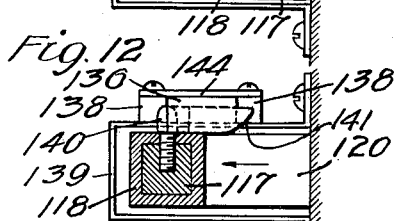
Inventor
George L. Rock
By
H. A. Patterson Atty.

Patented May 19, 1931

1,806,119

UNITED STATES PATENT OFFICE

GEORGE L. ROCK, OF CICERO, ILLINOIS, ASSIGNOR TO WESTERN ELECTRIC COMPANY, INCORPORATED, OF NEW YORK, N. Y., A CORPORATION OF NEW YORK

METHOD OF AND APPARATUS FOR PRODUCING TUBULAR ARTICLES

Application filed October 10, 1929. Serial No. 398,797.

This invention relates to a method of and apparatus for producing tubular articles, and more particularly to a method of and apparatus for producing tubular articles from pulp covered cores.

The principal objects of the present invention are to provide a simple and efficient method of and apparatus for producing tubular articles.

The method and apparatus of the present invention may be employed to advantage for producing small insulating sleeves of the type frequently employed for insulating the lead-in wires of electrical coils and the like.

In accordance with one embodiment of the invention, a continuous core in strand form having a homogeneous cylindrical covering of pulpous material loosely attached thereto is intermittently advanced between a pair of cooperating knives rotatable around the core and simultaneously movable transversely with respect to the longitudinal axis of the core. The rotating knives are advanced toward the core to an intermediate position wherein they are adapted to isolate a predetermined length of the pulp covering. The isolated section of the pulp covering is stripped from the end of the core in the form of a self-contained sleeve by means of a pair of cooperating reciprocable jaw members actuated in synchronism with the knives and the core advancing means. The stripped end section of the core is then severed by a further movement of the rotating knives toward each other, after which the knives are withdrawn to their original or starting positions.

It is believed that the invention will be clearly understood from the following detailed description when read in conjunction with the accompanying drawings, wherein Fig. 1 is an end elevational view, partly in section, of an apparatus embodying the features of the invention and by means of which the method may be practiced;

Fig. 2 is an enlarged vertical section on line 2—2 of Fig. 1;

Fig. 3 is a horizontal section on line 3—3 of Fig. 1;

Fig. 5 is a fragmentary detail section on line 5—5 of Fig. 3;

Figure 8:
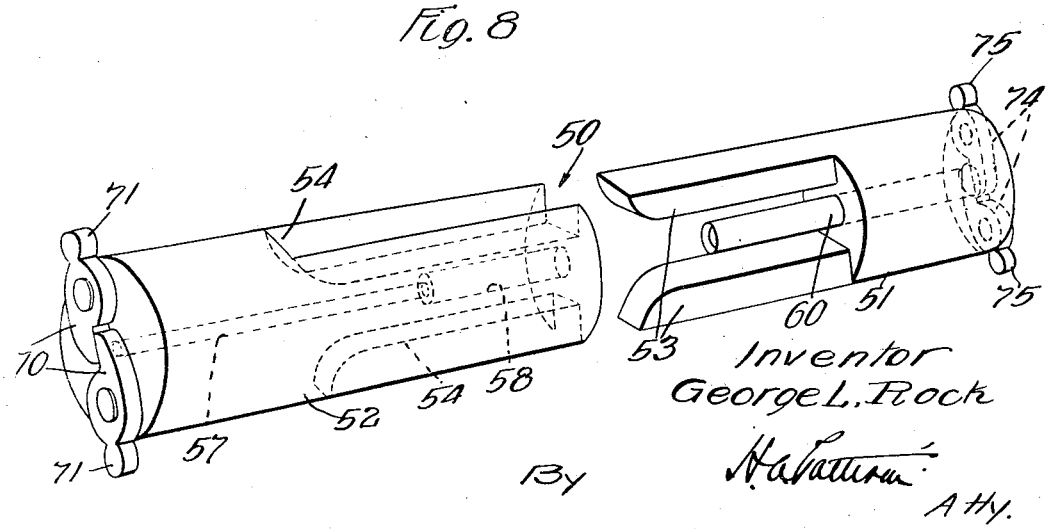

Figs. 6 and 7 are fragmentary detail sections on lines 6—6 and 7—7, respectively, of Fig. 2;

Fig. 8 is a perspective view of the guide tube with the cooperating right and left hand portions thereof shown disassociated for the purpose of more clearly illustrating the construction;

Fig. 9 is a detail section on line 9—9 of Fig. 3;

Fig. 10 is a detail section on line 10—10 of Fig. 3;

Figs. 11 and 12 are detail sections similar to Fig. 10 with the parts shown in different operating positions, and Figs. 13, 14, and 15 illustrate, progressively, the steps in the manufacture of tubular articles by the method and apparatus of the present invention.

Referring now to the drawings wherein like reference numerals designate corresponding parts throughout the several views, it will be observed that the framework of the apparatus comprises a horizontal base plate 20, right and left hand vertical end plates 21 and 22, respectively, an intermediate vertical supporting plate 23, and a cover 24. The end plate 22 is provided with a central opening for accommodating a cup-shaped housing 25 having an external flange 26 intermediate its ends by means of which it is secured to the end plate 22, as shown in Fig. 2. A sleeve 27 is mounted so as to be slidable in a bearing portion 28 at the outer end of the housing 25. A core 30 is secured within the sleeve 27 and is provided with a central longitudinal passage 31 of circular cross-section for accommodating a pulp covered wire 32 drawn therethrough from a supply source (not shown).

Extending through the vertical supporting plate 23 and restrained against rotation therein by a pin 34 (Fig. 2) is a sleeve 35. A large gear 36 is rotatably supported upon the sleeve 35 and is formed with a hub portion 37 which bears against the supporting plate 23. The gear 36 is driven by a pinion 38 (Fig. 3) keyed to a main drive shaft 39 connected to any suitable source of power (not shown). A cylindrical cam 40 is rotatable upon an elongated hub portion 41 of the gear 36 and fits loosely within an enlarged portion 43 of the sleeve 27. A compression spring 45 interposed between the outer end of the housing 25 and an external flange 46 formed at the inner end of the sleeve 27 serves to normally urge the sleeve 27 inwardly, whereby the cam 40 is pressed against a lobe 47 secured to the hub portion 41 of the gear 36.

Rotatably journaled within the sleeve 35 is a guide tube 50 (Fig. 8) comprising complementary right and left hand portions 51 and 52, respectively, the right hand portion 51 terminating in oppositely disposed tongue portions 53—53 for slidably engaging corresponding slots 54—54 formed in the left hand portion 52. The left hand portion 52 of the guide tube 50 projects beyond the end of the sleeve 35 and through a reduced hub portion 56 of the cam 40, and is provided with a central longitudinal passage 57 for accommodating the pulp covered wire 32. The passage 57 terminates in an enlargement or bore 58 for telescopic engagement with an extended portion of a guide sleeve 60 rigidly fixed within a central bore of the right hand portion 51 of the guide tube 50. It will be understood that the guide sleeve 60 and the central passage 57 of the left hand portion 52 of the guide tube cooperate to provide a continuous guide passage for the pulp covered wire 32, while at the same time permitting longitudinal movement of the left hand portion 52 with respect to the right hand portion 51, as hereinafter more fully described.

An internally projecting pin 62 (Fig. 3) secured to the supporting sleeve 35 engages a transverse slot 63 (Fig. 2) formed in the outer surface of the guide tube portion 51, whereby the latter is restrained against longitudinal movement with respect to the sleeve 35, but is permitted to turn slightly therein for a purpose which will become apparent as the detailed description progresses. Similarly, an internally projecting pin 65 secured to the cam 40 engages a transverse slot 66 formed in the outer surface of the guide tube portion 52, whereby the latter is restrained against longitudinal movement with respect to the cam 40 but is movable longitudinally with the cam. It will be understood that the portions 51 and 52 of the guide tube, although shown dissociated in Fig. 8 in order to more clearly illustrate the construction, are actually in interlocking engagement with each other at all times so that both portions are rotatable as a single unit.

Pivoted upon the outer end of the left hand portion 52 of the guide tube are a pair of cooperating gripper fingers or jaws 70—70 (Figs. 5 and 8) having outwardly projecting rounded portions 71—71 which extend into diametrically opposed slots 72—72 formed in the hub portion 56 of the cam 40. Similarly mounted upon the outer end of the right hand portion 51 of the guide tube are a pair of jaw members 74—74 (Figs. 6 and 8) having outwardly projecting portions 75—75 extending into diametrically opposed slots 76—76 formed in the outer end of the supporting sleeve 35. The construction and arrangement just described is such that by a slight turning movement of the cam 40 and guide tube 50 in a clockwise direction (Fig. 6), the jaws 70 are opened and the jaws 74 are closed, and upon turning the cam and guide tube in a counter-clockwise direction (Fig. 6) the jaws 70 are closed and the jaws 74 are opened.

Referring to Fig. 2, it will be understood that upon the rotation of the gear 36 in the direction indicated by the arrow, the cam 40 and the left hand portion 52 of the guide tube 50 are moved outwardly as the lobe 47 moves from the low point of the cam 40 to the high point thereof. At the beginning of this movement the cam 40 is caused to turn slightly in the same direction as the gear 36 due to its frictional engagement and camming action with the lobe 47, the amount of this turning movement being limited by the engagement of the pins 62 and 65 with the ends of the slots 63 and 66 as hereinbefore described. The slots 63 and 66 permit the cam 40 to turn sufficiently to open the jaws 70 and close the jaws 74 to securely grip the pulp covered wire 32. Upon the lobe 41 passing the high point of the cam 40 the guide tube portion 52 reaches the end of its outward movement and the cam 40 is caused to turn slightly in a direction opposite to that of the gear 36 due to a camming action similar to that described above. This turning movement of the cam 40 causes the jaws 70 to securely grip the wire and opens the jaws 74 sufficiently to release the wire, and thus upon the return movement of the guide tube portion 52, the pulp covered wire is advanced by the jaws 70 through the guide tube 50 and between the open jaws 74. The above described action is repeated with each revolution of the gear 36 and thus it will be understood that the wire is intermittently advanced through the guide tube 50, the amount advanced during each cycle of operation of the apparatus being dependent upon the particular construction of the cam 40, which obviously may be varied in accordance with the desired length of insulating sleeve to be produced.

Upon emerging from the jaws 74 the end portion of pulp covered wire passes through a pair of cooperating diametrically opposed knives 85—85, which, as best shown in Fig. 7, are mounted in a circular plate 86 so as to be slidable transversely with respect to the longitudinal axis of the pulp covered wire. The knives 85 are normally held spaced from each other by arcuate shaped springs 88—88 confined in a circular groove 89 of the plate 86. Each of the knives is attached to one end of one of the springs 88, as clearly shown in Fig. 7. The knife supporting plate 86 is attached to the face of a gear 90 secured to a sleeve 91 rotatably supported upon the sleeve 35 (Fig. 2). The gear 90 is driven from a gear 93 secured to the main drive shaft 39 (Figs. 1 and 3) whereby the knives 85 are rotated around the pulp covered wire 32.

Means is provided for actuating the knives 85 in synchronism with the wire feeding mechanism described above. This means comprises an annular cam 98 secured to or formed integral with the gear 36 and adapted to engage one end of a flexible plunger 99 (Figs. 2 and 4) slidably journalled in the supporting plate 23. At its opposite end, the plunger 99 engages the lower portion of a vertical plate 100 loosely mounted upon the sleeve 91 and having a reduced upwardly extending portion 101 (Fig. 6) by means of which it is pivoted upon an adjusting pin 102 threaded in a bracket 104 secured to the supporting plate 23. The plate 100 engages diametrically opposed pins 105—105 (Fig. 3) secured to an annular plate 106 loosely mounted upon the sleeve 91, the plate 106 being restrained against rotation with respect to the plate 100 by a pin 107 (Figs. 2 and 4) secured to the plate 106 and extending into a slot 108 formed in the plate 100. Loosely mounted upon the sleeve 91 is an annular plate 110 which is normally pressed against the plate 106 by diametrically opposed compression springs 111—111 (Fig. 3) interposed between the plate 110 and the gear 90. Pins 112—112 (Fig. 2) secured to the plate 110 project through suitable guide slots provided therefor in the gear 90 and terminate in tapered end portions 114—114 which engage correspondingly tapered end portions 115—115 of the knives 85. From the construction and arrangement just described, it will be understood that upon the movement of the pins 112 to the right (Fig. 2), the rotating knives 85 are moved toward each other against the action of the springs 88.

Figure 4:
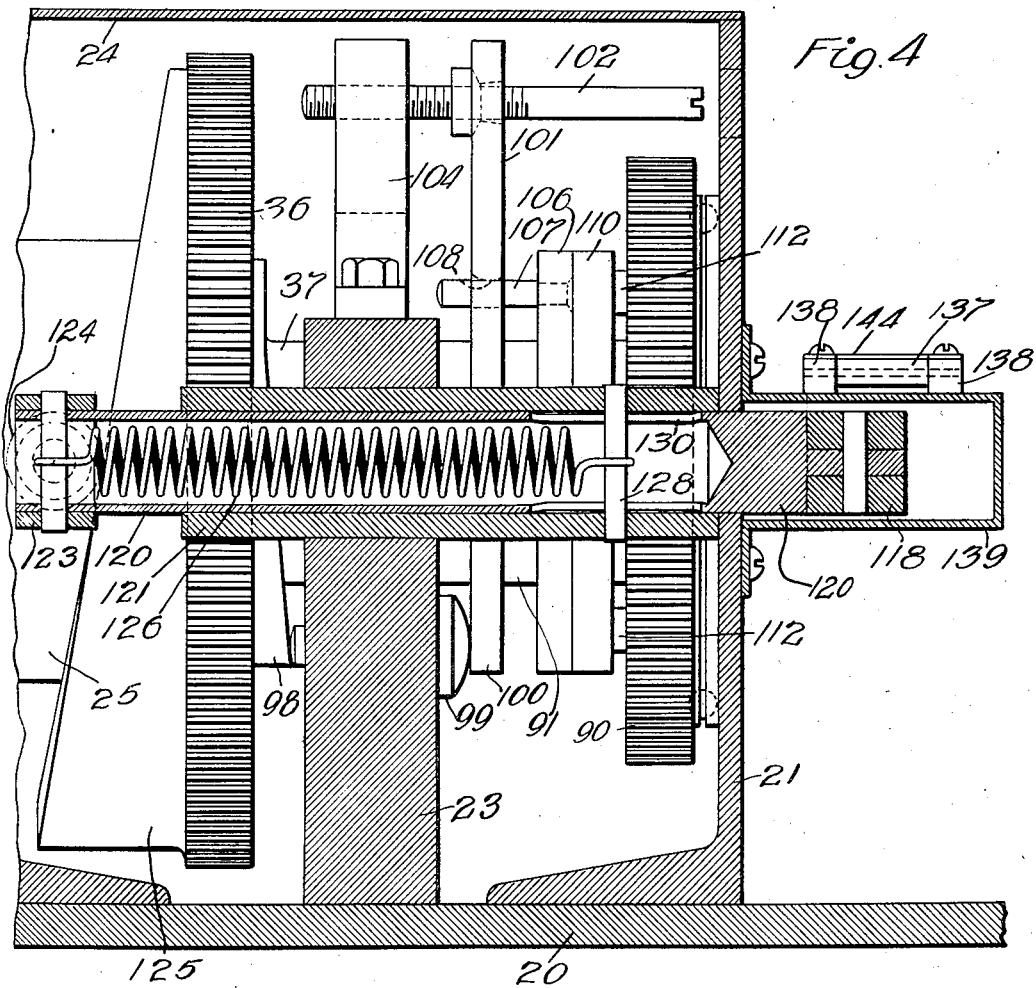
Fig. 4 is an enlarged vertical section on line 4—4 of Fig. 3.

The cam 98 is designed to advance the knives 85 first to an intermediate position, wherein they are adapted to sever the pulp covering of the wire 32, and then to a position wherein they are adapted to sever the stripped end portion of the wire. The knives 85 dwell at the intermediate position for a sufficient length of time to permit the isolated section of the pulp covering to be stripped from the end of the wire. The pulp covering is gripped between a pair of cooperating stripper jaws 116 and 117 (Figs. 1 and 9). The jaw 116 is attached to one end of a supporting bar 118 and the jaw 117 is slidably journalled in the supporting bar 118 so as to be movable toward and away from the jaw 116. A coil spring 119 (Fig. 9) serves to normally urge the jaw 117 toward the jaw 116 to securely grip the pulp covered wire therebetween. The jaw supporting bar 118 is attached to one end of a hollow shaft 120 which is slidably journalled in a sleeve 121 mounted in the supporting plate 23 (Figs. 3 and 4). An arm 123 attached to the opposite end of the shaft 120 carries a roller 124 which is arranged to engage a cylindrical cam 125 formed integral with the gear 36. A coil spring 126 housed within the hollow shaft 120 serves to constantly hold the roller 124 in contact with the cam 125. The spring 126 is attached, at one end, to the arm 123 and is fastened, at its opposite end, to a pin 128 which extends through oppositely disposed rectangular slots 130—130 formed in the shaft 120 and is attached to the sleeve 121. The cam 125 is designed to produce a reciprocatory motion of the jaw supporting bar 118 whereby the isolated section of the pulp covering is stripped from the end of the wire.

During the movement of the jaw supporting bar 118 from the position shown in Fig. 11 to the position shown in Fig. 12, the isolated section of the pulp covering is stripped from the end of the wire in the form of a self-contained sleeve 135 (Fig. 14). Upon the return movement of the jaw supporting bar 118, the jaw 117 is moved away from the jaw 116 to discharge the sleeve 135 and to engage the succeeding isolated section of the pulp covering. This is accomplished by means of a cam 136 formed at one end of a plate 137 which is pivoted, at its opposite end, between spaced raised portions 138—138 of a casing 139 attached to the end plate 21. During the return movement of the stripper jaws a pin 140 secured to the jaw 117 rides along a tapered inner surface 141 of the cam 136, whereby the jaw 117 is moved away from the jaw 116 against the action of the spring 119. The pin 140 projects through a rectangular slot 142 formed in the jaw supporting plate 118, whereby the jaw 117 is free to move with respect to the supporting bar 118. During the outward movement of the stripper jaws, the pin 140 rides along a tapered under-surface 143 of the cam 136, causing the plate 137 to be moved upwardly against the action of a leaf spring 144, as shown in Fig. 9. Thus, it will be understood that the stripper jaws are maintained closed by the spring 119 during the stripping operation.

In the operation of the above described apparatus, the pulp covered wire 32 is intermittently advanced through the guide tube 50 and between the knives 85 and the stripper jaws 116 and 117. The continuously rotating knives 85 are preliminarily moved toward the wire to a position wherein they are adapted to isolate the pulp covering of the previously advanced end portion of the wire. The isolated section of the pulp covering is then removed from the end of the wire in the form of a self-contained sleeve 135 (Fig. 14) by means of the stripper jaws 116 and 117, after which the stripped end portion of the wire is severed by a further movement of the knives toward each other, thus completing one cycle of operation of the apparatus. The wire advancing means, the severing knives, and the stripper jaws are operated in synchronism with each other through the rotation of the several cams 40, 98, and 125, all of which are carried by the large gear 36 which makes one complete revolution for each cycle of operation of the apparatus.

From the above description it will be understood that by employing the method and apparatus of the present invention, tubular articles such as insulating sleeves may be produced economically, expeditiously and with a minimum amount of attention on the part of the operation. It is obvious, of course, that the invention is not limited to the specific embodiment thereof herein illustrated and described, except insofar as is defined by the appended claims.

What is claimed is:

1. A method of producing tubular articles, which consists in isolating a section of the covering of a continuous coated core, removing the isolated section of the covering, and then severing the stripped section of the core.

2. A method of producing insulating sleeves, which consists in isolating a section of the insulation of an end portion of a continuous insulated wire, removing the isolated section of the insulation, and then severing the stripped section of the wire.

3. A method of producing insulating sleeves from a continuous pulp covered wire, which consists in intermittently advancing the wire, isolating a predetermined length of the pulp covering of the wire, removing the isolated section of the pulp covering, and then severing the stripped section of the wire.

4. In an apparatus for producing tubular articles from a continuous coated core, means for preliminarily isolating a portion of the covering of the core, means for removing the isolated portion of the covering, and means for thereafter rendering the first mentioned means operative for severing the stripped section of the core.

5. In an apparatus for producing insulating sleeves from a continuous insulated wire, means for preliminarily isolating a section of the insulation of the wire, means for removing the isolated section of the insulation, and means for thereafter rendering the first mentioned means effective for severing the stripped section of the wire.

6. In an apparatus for producing tubular articles from a continuous pulp covered wire, means for intermittently advancing the wire, a knife rotatable around the wire and movable transversely with respect thereto for isolating a predetermined length of the pulp covering of an end portion of the wire, means for stripping the isolated section of the pulp covering, and means for thereafter rendering the knife effective for severing the stripped section of the wire.

7. In an apparatus for producing insulating sleeves of pulpous material from a continuous pulp covered wire, a tubular member comprising a plurality of interconnected portions, means carried by one of said portions for advancing the wire through the tubular member, means for isolating a section of the insulation of an end portion of the wire, and means for removing the isolated section of the insulation.

8. In an apparatus for producing insulating sleeves from a continuous insulated wire, a tubular member having a longitudinally movable portion, a pair of jaws carried by the movable portion for gripping the wire and effective upon a longitudinal movement of said portion for advancing the wire through the tubular member, a pair of knives rotatable around the wire and movable transversely with respect to the longitudinal axis thereof, means for causing the knives to preliminarily isolate a section of the insulation of the wire, and means for removing the isolated section of the insulation prior to the severing of the wire.

9. In an apparatus for producing insulating sleeves from a continuous insulated wire, a tubular member comprising a plurality of interconnected portions, means for moving one of said portions, means carried by the movable portion and responsive to the movement thereof for intermittently advancing the wire, a pair of cooperating knives rotatable around the wire and movable transversely with respect thereto, means for rotating the knives around the wire, and means for intermittently moving the knives toward the wire to preliminarily isolate the insulation of the previously advanced portion of the wire and thereafter sever the wire.

10. In an apparatus for producing insulating sleeves of a given length from pulp covered wire, a guide tube comprising a pair of interconnected portions, a pair of cooperating jaws for gripping the wire carried by each of said portions, common means for moving one of said portions longitudinally with respect to the other portion and for simultaneously actuating the jaws to alternately release and grip the wire and thereby intermittently advance the wire through the guide tube, means for isolating a section of the pulp covering of a previously advanced portion of the wire, and a pair of cooperating stripper jaws for removing the isolated section of the pulp covering.

In witness whereof, I hereunto subscribe my name this 27th day of September, A. D. 1929.

GEORGE L. ROCK.